United States Patent
Cao et al.

(10) Patent No.: US 8,248,039 B2
(45) Date of Patent: Aug. 21, 2012

(54) CONTROL SYSTEM FOR AN ELECTRICAL GENERATOR AND METHOD FOR CONTROLLING AN ELECTRICAL GENERATOR

(75) Inventors: Shu Yu Cao, Singapore (SG); Anshuman Tripathi, Singapore (SG); Eng Kian Kenneth Sng, Singapore (SG); Gert Karmisholt Andersen, Hovedgård (DK); Bing Li, Singapore (SG)

(73) Assignee: Vestas Wind Systems A/S, Aarhus N (DK)

( * ) Notice: Subject to any disclaimer, the term of this patent is extended or adjusted under 35 U.S.C. 154(b) by 156 days.

(21) Appl. No.: 12/820,178

(22) Filed: Jun. 22, 2010

(65) Prior Publication Data

US 2010/0327585 A1 Dec. 30, 2010

Related U.S. Application Data (60) Provisional application No. 61/221,576, filed on Jun. 30, 2009.

(30) Foreign Application Priority Data

Jun. 30, 2009 (DK) .................. 2009 00809

(51) Int. Cl.
*F03D 9/00* (2006.01)
*H02P 11/00* (2006.01)
(52) U.S. Cl. ........................................ 322/37; 290/44
(58) Field of Classification Search ............. 322/44, 322/37, 28, 24; 290/7, 40 C, 44, 55; 700/287, 700/290, 286
See application file for complete search history.

(56) References Cited

U.S. PATENT DOCUMENTS

| 4,994,684 | A | * | 2/1991 | Lauw et al. | 290/52 |
|---|---|---|---|---|---|
| 5,798,631 | A | | 8/1998 | Spee et al. | |
| 6,784,634 | B2 | * | 8/2004 | Sweo | 318/727 |
| 7,309,974 | B2 | * | 12/2007 | Sarlioglu et al. | 322/47 |
| 7,554,302 | B2 | * | 6/2009 | Schauder | 322/44 |
| 2002/0101221 | A1 | * | 8/2002 | Stefanovic et al. | 322/24 |
| 2007/0102936 | A1 | * | 5/2007 | Sarlioglu et al. | 290/52 |
| 2007/0108771 | A1 | * | 5/2007 | Jones et al. | 290/44 |
| 2007/0200348 | A1 | | 8/2007 | Ichinose et al. | |

(Continued)

FOREIGN PATENT DOCUMENTS

CN 101196163 A 6/2008

(Continued)

OTHER PUBLICATIONS

Danish Patent and Trademark Office, Search Report issued in related application No. PA200900809 dated Feb. 5, 2010.

(Continued)

*Primary Examiner* — Julio Gonzalez
(74) *Attorney, Agent, or Firm* — Wood, Herron & Evans, LLP (57) ABSTRACT

A method for validating and initializing a control system for an electrical generator connected to a power converter in a wind turbine. The method may include generating a first parameter value representing control signal for controlling the stator flux of a stator of the electrical generator, measuring a second parameter value specifying an electrical operational characteristic of the electrical generator, and determining an accuracy level of the control signal based on the first parameter value and the second parameter value, wherein the accuracy level of the control signal has to fall within a predefined threshold for the control system to be validated.

16 Claims, 8 Drawing Sheets

U.S. PATENT DOCUMENTS

| | | |
|---|---|---|
| 2007/0299548 A1 | 12/2007 | Weitkamp |
| 2008/0284171 A1* | 11/2008 | Cory .............................. 290/44 |
| 2008/0296521 A1 | 12/2008 | Narayanasamy et al. |
| 2009/0146500 A1* | 6/2009 | Jones et al. .................... 307/82 |
| 2009/0212564 A1* | 8/2009 | Yang et al. ..................... 290/44 |

FOREIGN PATENT DOCUMENTS

| | | |
|---|---|---|
| CN | 00101270723 A | 9/2008 |
| DE | 102004056254 A1 | 6/2006 |
| EP | 1748549 A2 | 1/2007 |
| EP | 1801414 A2 | 6/2007 |
| EP | 1909371 A2 | 4/2008 |
| JP | 2005080481 A | 3/2005 |
| WO | 2008052714 A1 | 5/2008 |
| WO | 2008074324 A2 | 6/2008 |
| WO | 2010049412 A1 | 5/2010 |

OTHER PUBLICATIONS

Danish Patent and Trademark Office, Office Action issued in related application No. PA200900809 dated Feb. 9, 2010.

European Patent Office, extended European search report issued in related Application No. 10167128.7 dated Mar. 26, 2012.

* cited by examiner

CONTROL SYSTEM FOR AN ELECTRICAL GENERATOR AND METHOD FOR CONTROLLING AN ELECTRICAL GENERATOR

CROSS-REFERENCE TO RELATED APPLICATIONS

This application claims the benefit of U.S. Provisional Application No. 61/221,576, filed Jun. 30, 2009, and claims priority under 35 U.S.C. §119 to Danish Patent Application No. PA 2009-00809, filed Jun. 30, 2009. The content of each of these applications is hereby incorporated by reference herein in its entirety for all purposes.

TECHNICAL FIELD

The present invention relates generally to a control system for an electrical generator and a method for controlling an electrical generator.

BACKGROUND

In recent years, it has become very common to use wind for the generation of electrical power. In order to do this, wind is captured by a set of blades of a wind power plant. The captured wind causes a shaft connected to the set of blades to rotate. The shaft is typically connected to a rotor of an electrical generator which is rotated in accordance with the rotation of the shaft, possibly at a multiple of the rotation speed of the shaft in case the rotor is connected to the shaft via a gearbox. The electrical generator converts the mechanical power provided by the wind in form of the rotation into electrical power which may be supplied to a power grid.

The electromagnetic power of, e.g., a synchronous electrical generator depends on the magnitude of the stator flux vector and its location with respect to the rotor flux vector. If the position of the rotor flux vector is known, it is possible to control the stator flux such that a desired magnitude of the electromagnetic power provided by the electrical generator is achieved.

However, if an error occurs in the stator flux control and the stator flux is not controlled correctly, e.g., due to an error in the calculation of the respective control signal or due to malfunction of a sensor in the measurement of an input parameter to the stator flux control scheme, the stator flux control may fail and the electrical and electronic devices of the system, e.g., the wind turbine generator converter control system, may be damaged.

Hence, an objective of the present invention may be seen in providing a control method for an electrical generator which allows reducing the risk of a failure of the stator flux control system compared to known methods.

Another objective of the present invention may be seen in providing a control method for synchronizing the converter output voltage with the generator Bemf (back electromotive force) voltage before connecting the generator with the converter so that the inrush current and torque in power connection transient is minimized. This may reduce the stress on power devices and the driver train.

SUMMARY

According to an embodiment, a method for validating a control system for an electrical generator connected to a power converter in a wind turbine is provided, the method comprising generating a first parameter value representing a control signal for controlling the stator flux of a stator of the electrical generator, measuring a second parameter specifying an electrical operational characteristic of the electrical generator, and determining an accuracy level of the control signal based on the first parameter value and the second parameter value, e.g. based on the difference of the first parameter value and the second parameter value. In one embodiment, the accuracy level of the control signal has to fall within a predefined threshold for the control system to be validated. In one embodiment, a third parameter value specifying an accuracy level of the at least one first parameter value based on the first parameter value and the second parameter value is determined.

According to one embodiment, the method further comprises obtaining a fourth parameter value specifying a mechanical operational characteristic of the electrical generator, wherein the accuracy level of the control signal is determined based on the first parameter value, the second parameter value, and the fourth parameter value. In one embodiment, a flux controller is used and the inputs to the flux controller are the flux reference settings and a measured fourth parameter value specifying the mechanical operational characteristics of the electrical generator.

According to an embodiment, the method is executed as part of a generator start-up process.

According to an embodiment, the electrical operational characteristic is a stator line voltage of the generator.

According to an embodiment, the mechanical operational characteristic includes at least one of the position and the rotational speed of a rotor of the electrical generator.

According to an embodiment, the control signal is provided to the power converter, and a resultant converter output voltage is obtained for example if the PWM (pulse width modulation) is enabled and the generator side converter is disconnected from the generator terminal by a contactor.

According to an embodiment, the controller output voltage reference and the converter output voltage are synchronized with the stator line (or stator terminal) voltage at the generator when the control system is validated.

According to an embodiment the generator start-up process is stopped if the control system fails to be validated.

According to an embodiment, a control system for an electrical generator connected to a power converter in a wind turbine is provided, the method comprising a stator flux controller configured to generate a first parameter value representing a control signal for controlling the stator flux of a stator of the electrical generator, a measuring device configured to measure a second parameter value specifying an electrical operational characteristic of the electrical generator, and a validation unit configured to determine an accuracy level of the control signal based on the first parameter value and the second parameter value, wherein the accuracy level of the control signal has to fall within a predefined threshold for the control system to be validated.

According to an embodiment, the control system is able to provide a comparison between the power converter output voltage and the back electromotive force voltage of the electrical generator.

According to an embodiment, the control signal being provided to the power converter and leading to a converter output.

According to an embodiment, the control system further comprises a determining device configured to determine a third parameter value specifying an accuracy level of the at least one first parameter value based on the first parameter value and the second parameter value.

According to an embodiment, the control system further comprises a further measuring device configured to obtain a fourth parameter value specifying a mechanical operational characteristic of the electrical generator.

According to an embodiment, the mechanical operational characteristic comprises at least one of the position and the rotational speed of a rotor of the electrical generator.

According to an embodiment, the further measuring device is an encoder.

According to an embodiment, the measuring device is a voltage sensor.

According to an embodiment, the electrical generator is part of a power generation system which may be set, from a starting mode to an operation mode in which it supplies power generated by the electrical generator to a power grid and wherein the control system is configured such that the control signal is generated and the first parameter value and the second parameter value are measured in the starting mode.

According to an embodiment, the electrical generator is not connected to the power converter in the starting mode.

According to an embodiment, the electrical operational characteristic is a line-to-line stator voltage.

According to an embodiment, the control signal represents a stator voltage.

According to an embodiment, a computer readable medium according to the method for validating a control system described above is provided.

The method may further comprise, after the control system is validated, transiting smoothly from a start-up control mode to a power generation control mode by first closing a generator side contactor followed by enabling a pulse width modulation gating signal to the power converter, and further followed by enabling power feedback control for power producing flux reference component generation and enabling the field weakening control for magnetization flux reference component generation.

In one embodiment, the validation process described above initializes the power control system and ensures smooth power connection when the machine side contactor is closed followed by enabling the PWM modulation. Large transient current is avoided when the power generation mode is entered when the converter output voltage is synchronized with the generator Bemf voltage in the validation process.

According to one embodiment, a method for initialization of a control system for an electrical generator connected to a power converter in a wind turbine is provided, the method comprising generating a stator flux control signal for controlling the stator flux of a stator of the electrical generator in a start-up control mode by disabling a pulse width modulation output to the power converter or disconnecting the power converter from the electrical generator, afterwards transiting from the start-up control mode to a power generation control mode by first closing the generator side contactor followed by enabling a pulse width modulation gating signal to the power converter, and further followed by enabling power feedback control for power producing flux reference component generation and enabling the field weakening control for magnetization flux reference component generation.

In one embodiment, a stator flux control signal for controlling the stator flux of a stator of the electrical generator in a start-up control mode is generated for a short period of time.

In one embodiment, it is smoothly transited from the start-up control mode to the power generation control mode.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Exemplary embodiments of the control system and the method for controlling an electrical generator in accordance with the present invention will be described in detail below with reference to the accompanying figures. It will be appreciated that the exemplary embodiments described below can be modified in various aspects without changing the essence of the invention. Furthermore, embodiments described in the context of the method for controlling an electrical generator are analogously valid for the control system, the method for initialization of a control system for an electrical generator, and the computer readable medium and vice versa.

Figure 1:
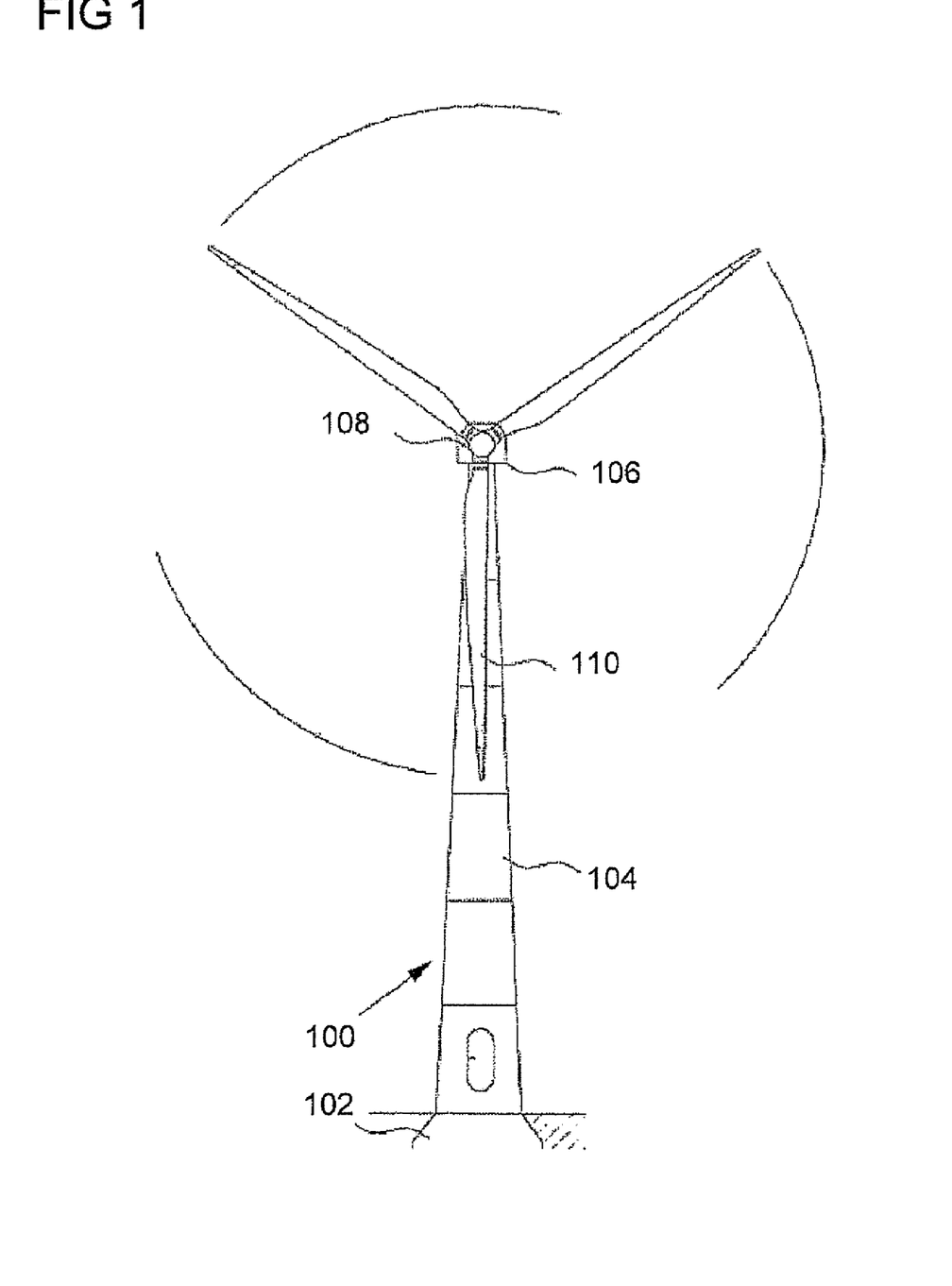
FIG. 1 illustrates a common setup of a conventional wind turbine.

FIG. 1 illustrates a common setup of a conventional wind turbine 100. The wind turbine 100 is mounted on a base 102. The wind turbine 100 includes a tower 104 having a number of towers sections, such as tower rings. A wind turbine nacelle 106 is placed on top of the tower 104. The wind turbine rotor includes a hub 108 and at least one rotor blade 110, e.g. three rotor blades 110. The rotor blades 110 are connected to the hub 108 which in turn is connected to the nacelle 106 through a low speed shaft which extends out of the front of the nacelle 106.

Figure 2:
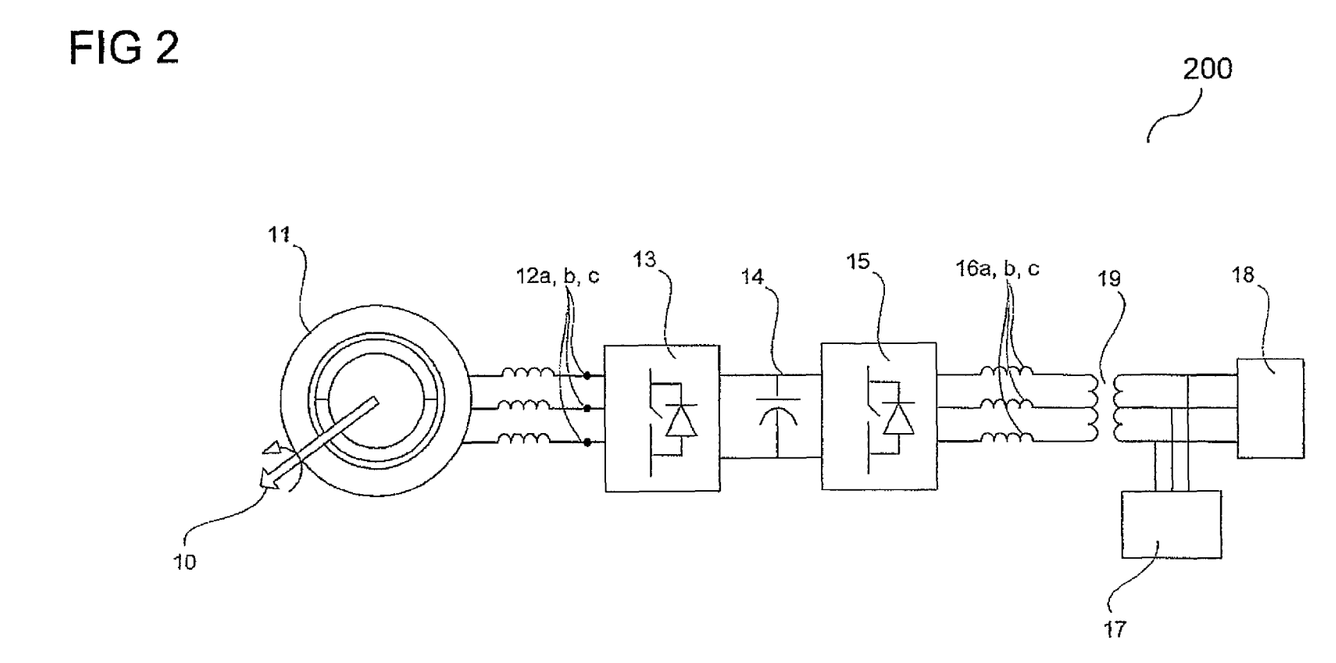
FIG. 2 illustrates an example of power generation system according to an embodiment of the present invention.

FIG. 2 illustrates an example of power generation system 200 according to an embodiment.

A shaft 10 transfers mechanical energy from an energy source, for example the at least one rotor blade 110 shown in FIG. 1, to a rotor of a variable speed generator 11. The shaft 10 is connected to the at least one rotor blade 110 and is for example connected to the rotor via a gearbox in order to adapt the rotational speed of the shaft 10 (i.e. the speed of the wind turbine blades) to a speed range suitable for the generator 11. The generator 11 converts the mechanical energy provided via the shaft 10 into electrical energy and delivers the electrical energy at a set of stator terminals 12a, 12b, 12c. The rotational speed of the shaft 10 varies as a function of the wind speed. Since the rotational speed of the rotor of the generator 11 is proportional to the rotational speed of the shaft 10, the amplitude and frequency of the voltage signal provided by the generator 11 at the stator terminals 12a, 12b, 12c varies in accordance with the rotational speed of the shaft 10. The generator may be an electrically excited synchronous generator, a permanent magnet (PM) generator. The terminals 12a, 12b, 12c of the generator 11 are connected to a generator side power converter 13. The converter 13 for example includes a set of switches in the form of, for example, MOSFETs, GTOs, IGBTs or BJTs.

The converter 13 functions, under normal operation, as an active rectifier converting the variable frequency AC voltage provided by the generator 11 into a DC voltage. The conversion may be controlled using a pulse width modulation (PWM) scheme, wherein control signals are applied to the switches of the converter 13 in order to provide the desired conversion functionality. In one embodiment, the switches are controlled by employing a space vector modulation scheme.

The output of the converter 13 is provided to a DC link 14 which includes a link capacitor for reducing the voltage ripple on the DC link.

The DC link 14 is connected to a grid side power converter 15. The topology of the grid side power converter 15 may be similar to the generator side power converter 13. The grid side power converter 15 for example normally operates as an inverter for converting the DC voltage on the DC link 14 into a regulated AC voltage for feeding active and reactive power to a power grid 18.

The output of the grid side power converter 15 may be filtered by means of inductors 16a, 16b, and 16c in order to, for example, remove high order harmonics from the output power signal. The output power signal is then provided to the power grid 18 via a transformer 19. The output power signal may, if needed, be filtered by a filter 17 in order to keep the interference or harmonic distortion at a low value.

Figure 3:
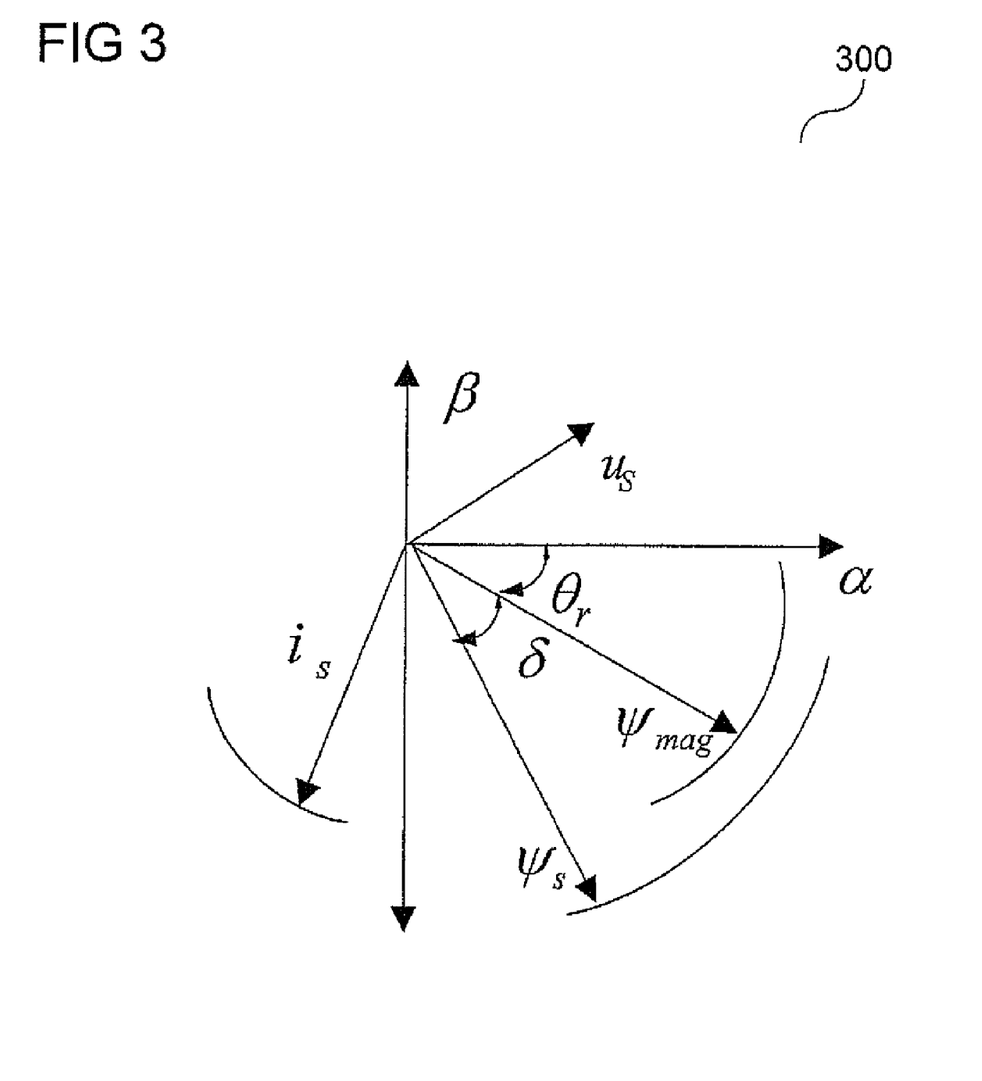
FIG. 3 illustrates a vector diagram for a synchronous electrical generator represented in a stationary reference frame.

FIG. 3 illustrates a vector diagram 300 for a synchronous electrical generator represented in a stationary reference frame.

The diagram includes two stationary axes denoted $\alpha$ and $\beta$. The stationary reference frame is thus also referred to as $\alpha\beta$ (reference) frame.

A transformation of a voltage from the three phase stationary coordinate system, which may also be referred to as the stationary three phase abc reference frame, to the $\alpha\beta$ frame may be performed according to $$\begin{bmatrix} U_\alpha \\ U_\beta \end{bmatrix} = \begin{bmatrix} 2/3 & -1/3 & -1/3 \\ 0 & \sqrt{3}/3 & -\sqrt{3}/3 \end{bmatrix} \cdot \begin{bmatrix} U_a \\ U_b \\ U_c \end{bmatrix}$$

wherein $U_a$, $U_b$, $U_c$ refer to the three phase voltages and $U_\alpha$, $U_\beta$ refer to the components of the voltage in the $\alpha\beta$ frame.

In FIG. 3, a first vector, denoted by $\Psi_{mag}$, represents the magnetizing flux.

In the example shown in FIG. 3, which refers to a synchronous generator, the magnetizing flux corresponds to the rotor flux $\Psi_r$. The rotor flux may be generated by means of a permanent magnet, as in a PM generator, or by excitation of a field coil in the electrically excited synchronous generator. The arc at the tip of the rotor flux vector illustrates that the vector rotates about the origin of coordinates in FIG. 3. The angular displacement of the rotor flux vector from the $\alpha$ axis is denoted by $\theta_r$ in FIG. 3.

In a corresponding manner, the stator flux vector, denoted by $\Psi_s$ in FIG. 3, is a vector which rotates about the origin of coordinates.

In steady state operation the stator flux vector rotates in the stationary reference frame with an angular speed equal to the rotor flux vector. The angular displacement of the stator flux vector from the rotor flux vector is denoted as load angle $\delta$ in FIG. 3.

The electromagnetic power $P_{EM}$ of a synchronous generator is proportional to $\omega\Psi_s\times\Psi_r$ where $\omega$ is the rotational speed of the rotor. This means that $P_{EM}=f(|\Psi_s|, |\Psi_r|, \delta)$.

From this, it can be seen that for a given speed of operation (i.e. a given rotor rotation speed), the electromagnetic power depends on the magnitude of the stator flux vector and its location with respect to the rotor flux vector. If the position of the rotor flux vector is known, it is possible to apply a voltage to the stator that positions the stator flux vector to give the desired magnitude of the power at a given rotational speed. Hence, by controlling the stator flux vector, the electromagnetic power, which corresponds to the power given to the load, can be obtained as desired.

A control system for controlling the stator flux in accordance with a desired power output is described in the following with reference to FIG. 4.

Figure 4:
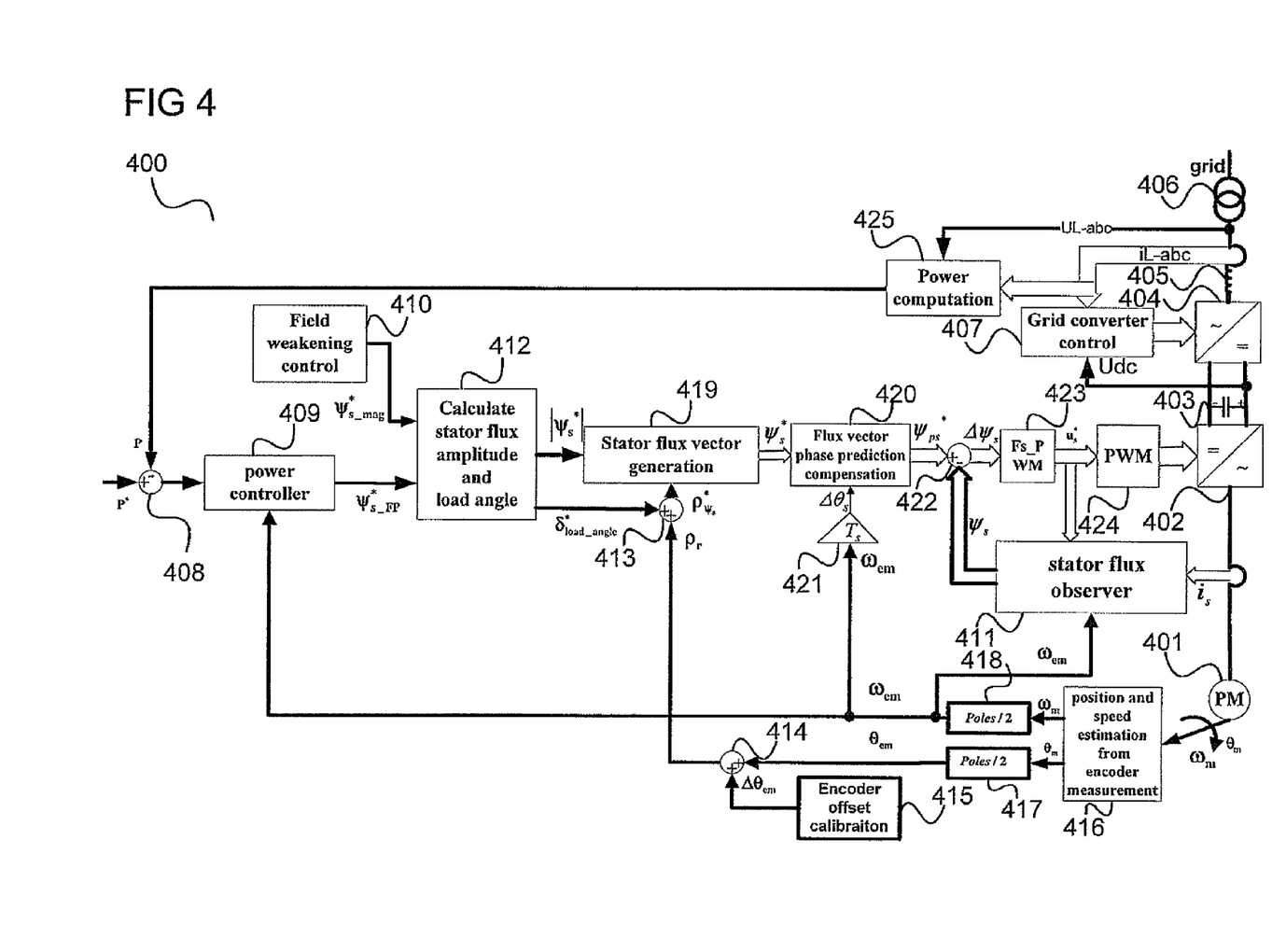
FIG. 4 shows a power generation system comprising a control system in power generation mode according to an embodiment of the present invention.

FIG. 4 shows a power generation system 400 comprising a control system in power generation mode according to an embodiment of the invention.

The power generation system 400 includes, similarly to the power generation system 200, an electrical generator 401, a generator side power converter 402, a grid side power converter 404, coupled by a DC link 403, and a power grid 406 coupled to the grid side power converter 404 by a line filter 405, for example corresponding to the inductors 16a, 16b, 16c shown in FIG. 2. The grid side power converter 404 is controlled by a grid side power converter controller 407.

The power generation system 400 includes, as a part of its control system, a power computation block 425 which measures the power P output by the power generation system 400 at the power grid side, e.g. based on the grid side phase current $i_L$ and the grid side phase voltage $u_L$. The measured grid side power P is subtracted from with the grid side output power reference P*, which may be seen as the grid power error signal, by a first subtracter block 408, and the difference between P and P* is fed to a power controlling block with speed variation loop gain compensation 409. The power controlling block 409 also receives the electrical angular frequency $\omega_{em}$ of the rotor of the generator 401 as input.

The power controller 409 outputs a field power generation flux reference denoted as $\Psi^*_{s\_FP}$ which is supplied as one input to the stator flux amplitude and load angle calculation block 412. The magnetization flux reference to block 412 is generated by the field weakening control block 410.

The stator flux amplitude and load angle calculating block 412 calculates the amplitude of the stator flux reference $|\Psi^*_s|$ in accordance with $$|\Psi^*_s| = \sqrt{(\Psi^*_{s\_mag})^2 + (\Psi^*_{s\_FP})^2}.$$

Furthermore, the stator flux amplitude and load angle calculating block 412 calculates the load angle reference of the induction generator $\delta^*_{load\_angle}$ in accordance with $$\delta^*_{load\_angle} = \arctan(\Psi^*_{s\_FP}/\Psi^*_{s\_mag}).$$

The load angle reference of the induction generator $\delta^*_{load\_angle}$ is added by a first adder 413 to the rotor flux vector angle $\rho_r$ (in the $\alpha\beta$ reference frame) which is itself generated by a second adder 414 adding the rotor electrical position $\theta_{em}$, e.g. provided by means of a shaft mounted encoder, to an encoder electrical position offset $\Delta\theta_{em}$, e.g. provided by an encoder offset calibration block 415. The rotor electrical position $\theta_{em}$ may be received by means of an estimation block 416 which provides an estimate for the mechanical angular frequency $\omega_m$ of the rotor of the generator 401 and the mechanical position $\theta_m$ of the rotor of the generator 401. The mechanical angular frequency $\omega_m$ of the rotor of the generator 401 may be seen as a mechanical operational characteristic of the electrical generator. By taking into account the number of poles of the generator 401, the rotor electrical position $\theta_{em}$ is calculated from the mechanical position $\theta_m$ of the rotor by a first transforming block 417 and the electrical angular frequency $\omega_{em}$ of the rotor is calculated from the mechanical angular frequency $\omega_m$ of the rotor by a second transforming block 418.

The output of the first adder 413 is the stator flux reference vector angle $\rho^*_{\psi_s}$ which is fed, together with the amplitude of the stator flux reference $|\Psi_s^*|$, to a stator flux vector generation block 419. The stator flux vector generation block 419 generates the stator flux reference vector $\Psi^*_s$. The components of the stator flux reference vector $\Psi^*_s$ may be calculated according to $$\Psi^*_{s\alpha}=|\Psi^*_s|\cos\rho^*_{\psi_s} \text{ and}$$

$$\Psi^*_{s\beta}=|\Psi^*_s|\sin\rho^*_{\psi_s}$$

The stator flux reference vector $\Psi^*_s$ is fed to a flux vector phase prediction compensation block 420, which receives, as other input, a predicted angular position change $\Delta\theta_s$ which is provided by a multiplication of the electrical angular frequency $\omega_{em}$ and the control system sampling time Ts in block 421.

The flux vector phase prediction compensation block 420 generates the stator flux reference vector $\Psi_{ps}^*$ which subtracts in block 422 the measured stator flux vector $\Psi_s$ output from the stator flux observing block 411. The flux error vector $\Delta\Psi_s$ of the stator flux reference $\Psi_{ps}^*$ and the measured stator flux vector $\Psi_s$, which may be seen as a stator flux control signal, is multiplied by the PWM switching frequency (Fs_PWM) in block 423 which generates the stator reference voltage vector $u_s^*$ for PWM modular input which is supplied to a PWM modulator 424 controlling the conversion carried out by the generator side power converter 402. The stator voltage reference vector and the measured stator current are fed into the block 411 for stator flux observation.

As explained above and illustrated in FIG. 4, the power generation system 400 includes a stator flux control system to control the generator side power converter 402 of the power generation system 400 such that the power output by the power generation system 400 has a desired value. The control system has as output the stator voltage vector $u_s^*$, also referred to as the stator reference voltage. The control depends on measured input parameters to the stator flux control system, such as the mechanical angular frequency $\omega_m$ of the rotor of the generator 401 and the mechanical position $\theta_m$ of the rotor of the generator 401. These parameters are for example determined by means of an encoder. If the encoder fails, the converter control system (i.e. the stator flux control system) may malfunction and, for example, a large torque transition may occur in the drive train possibly damaging the mechanical component in the driver train. However, it is difficult to capture all the encoder failure patters in a reliable way within the stator flux power generation stage.

Furthermore, the stator flux control system performance can greatly deteriorate when an incorrect rotor flux value $\Psi_r$ and an incorrect encoder position offset $\Delta\theta_{em}$ are applied to the stator flux control system. Decoupling of field power and magnetization flux control cannot be achieved. The converter loss can greatly increase. Furthermore, it is difficult to tell during the power generation stage whether the rotor flux value $\Psi_r$ and the encoder position offset $\Delta\theta_{em}$ are incorrect.

Figure 7:
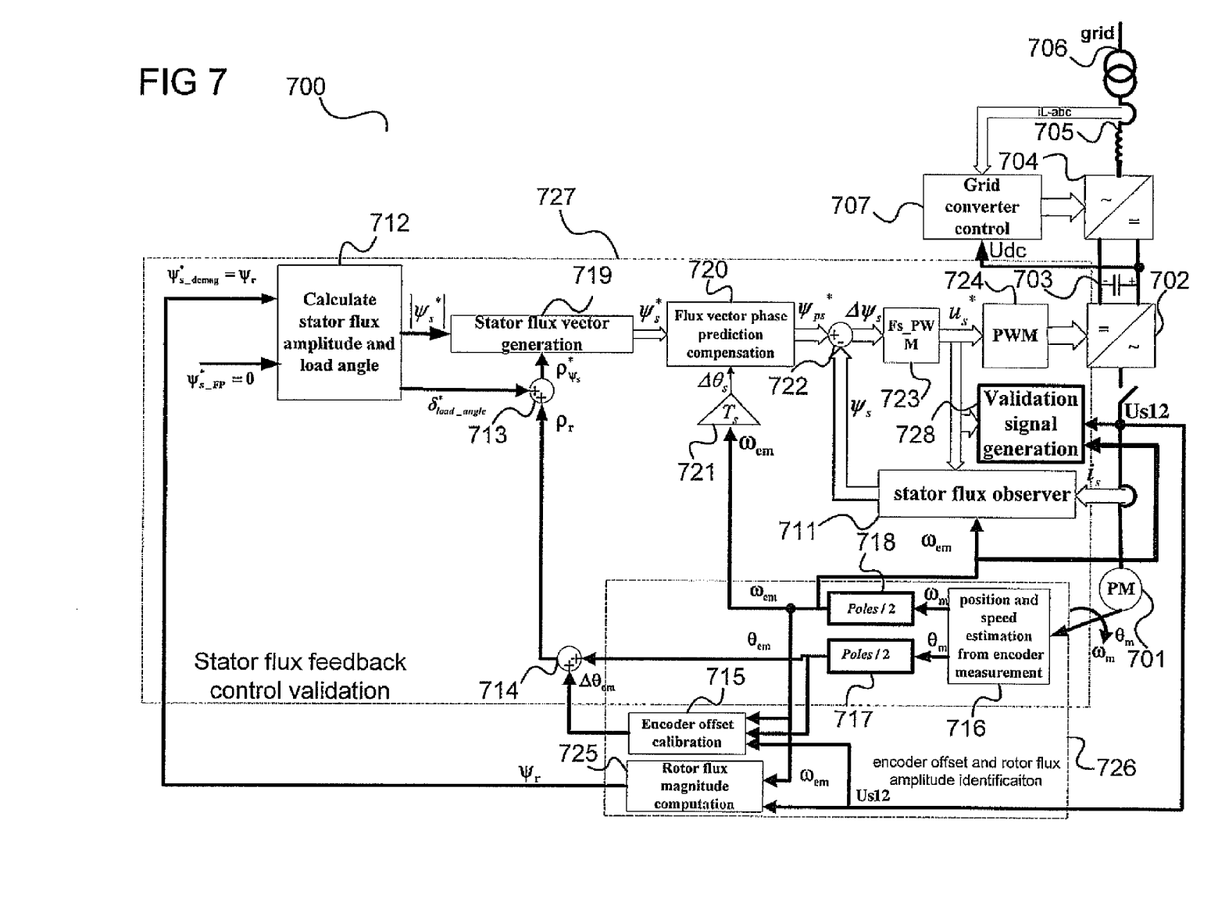
FIG. 7 shows a power generation system comprising a control system in start-up mode according to an embodiment of the present invention.

Additionally, it is difficult to validate the core algorithm for stator flux control in the power generation stage when the stator current flows in the generator. Converter system failure may occur in this condition due to many possible reasons. It should further be noted that both the stator flux control and the PWM modulator block 424 (or 724) need some time to be stabilized in order to generate the same stator voltage as the open circuit Bemf voltage. The PWM modulator block 424 should be disabled (i.e. the power generation system 400 should be operated at open circuit) until the stator flux control output has been initialized to generate the voltage reference which is synchronized with generator Bemf voltage. This eliminates the possible large current transition when PWM modulator block 424 is enabled.

According to one embodiment a self-diagnostic method for a stator flux control system for an electrical generator is provided which allows improving the reliability of the power generation system control system. The self-diagnostic method is for example implemented using a control system as shown in FIG. 5.

Figure 5:
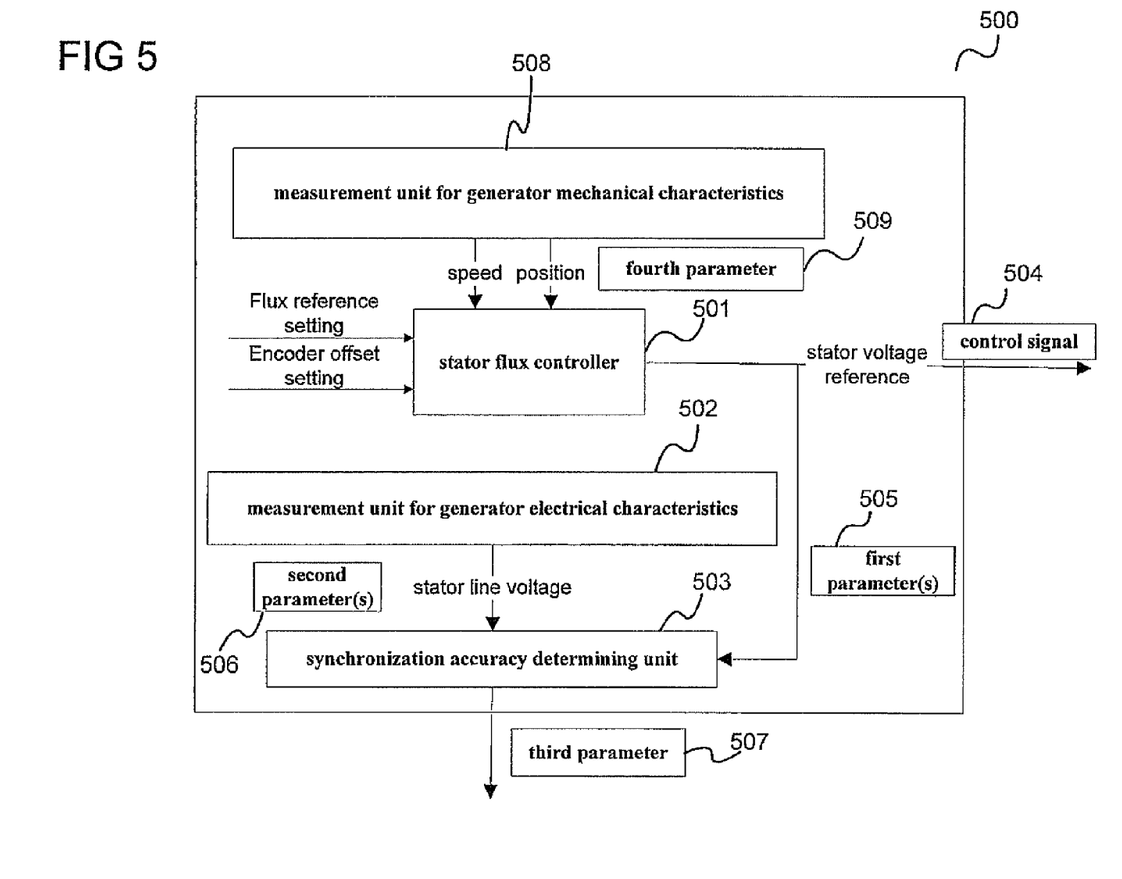
FIG. 5 shows a block diagram of a generator Bemf synchronization control system for an electrical generator in start-up mode according to an embodiment of the present invention.

FIG. 5 shows a generator Bemf synchronization control system 500 in start-up mode for an electrical generator according to an embodiment.

The control system 500 includes a stator flux controller 501 configured to generate a control signal 504 for controlling the stator flux of a stator of the electrical generator. The speed and position signal are obtained from generator mechanical characteristics measurement block 508 and are fed into the stator flux controller 501 as the fourth parameter 509. Furthermore, the control system 500 includes a measuring block 502 configured to measure at least one second parameter value 506 specifying an electrical operational characteristic of the electrical generator.

The control system 500 further includes a stator voltage synchronization accuracy determining block 503 configured to determine a third parameter value 507 specifying an accuracy level of the at least one first parameter value 505 based on the at least one first parameter value 505 and the at least one second parameter value 506.

Illustratively, the function of a stator flux control system for an electrical generator is in one embodiment validated based on a measured operation characteristic of the electrical generator, e.g. a measured line-to-line voltage at two of the stator terminals of the electrical generator.

In one embodiment, the control system further includes a controller configured to control the electrical generator in start-up operation mode to decide whether the synchronization accuracy is acceptable.

In one embodiment, the electrical generator is part of a power generation system and the controller is configured to control the power generation system after the synchronization in start-up mode is validated to be successful.

In one embodiment, the electrical generator is part of a power generation system which may be set, from a first operation mode i.e. start-up mode, to a second operation mode i.e. power generation mode in which it supplies power generated by the electrical generator to a power grid and wherein the control system 500 is configured such that the at least one first parameter value is generated and the at least one second parameter value is measured in the first operation mode.

For example, the control system is configured such that the third parameter value is determined in the first operation mode.

The first operation mode is for example a starting operation mode. For example, in the first operation mode, the electrical generator does not supply power to the power grid.

According to one embodiment the stator flux controller is configured to supply the control signal to a converter circuit and the control signal is adapted to control the converter circuit to convert electric power output by the electrical generator in accordance with the requirements of a power grid to which the power is to be supplied.

The converter circuit may be a pulse width modulation converter circuit.

For example, in the first operation mode, the converter circuit is either not activated or the converter output is disconnected from the generator by a contactor such that the electrical generator does not supply power to the power grid.

The operational characteristic is for example an electrical operational characteristic of the electrical generator.

The operational characteristic is for example a characteristic of the power generated by the electrical generator. The operational characteristic may for example be a stator voltage, e.g. a line-to-line stator voltage.

According to one embodiment, the control signal represents a stator voltage. The at least one first parameter may includes the stator voltage.

According to one embodiment, the control system further includes another measuring circuit configured to determine the fourth parameter value specifying a mechanical operational characteristic of the electrical generator wherein the stator flux controller is configured to generate the control signal based on the at least one fourth parameter value.

According to one embodiment, the mechanical operational characteristics include the position and the rotational speed of the electrical generator.

According to one embodiment, the third parameter indicates whether the difference of the at least one first parameter value and the at least one second parameter value is below a pre-defined threshold.

The electrical generator is for example a wind turbine generator. According to one embodiment, a wind turbine generator is provided including a control system as described above.

Figure 6:
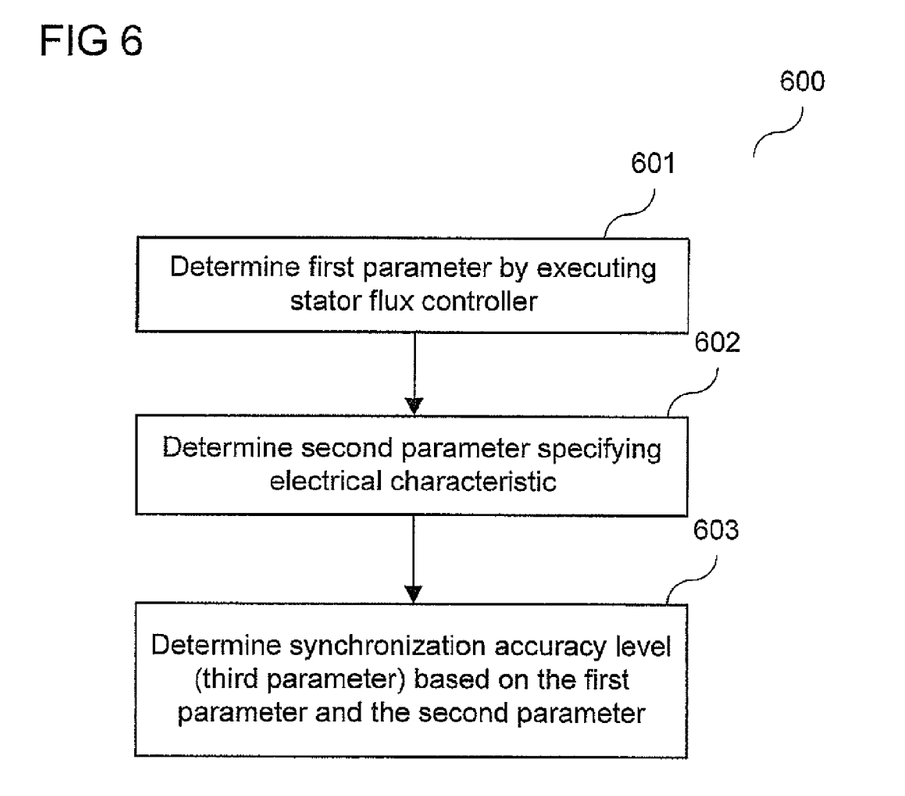
FIG. 6 shows a flow diagram according to an embodiment of the present invention for start-up mode.

A control system according to an embodiment for example carries out a method for controlling an electrical generator as illustrated in FIG. 6.

FIG. 6 shows a flow diagram 600 according to an embodiment for start-up mode.

In 601, at least one first parameter value representing a control signal for controlling the stator flux of a stator of an electrical generator is generated, e.g. by executing a stator flux controller.

In 602, at least one second parameter value specifying an operational characteristic of the electrical generator is generated.

In 603, a third parameter value specifying an accuracy level of the at least one first parameter value is determined based on the at least one first parameter value and the at least one second parameter value.

An example of a control system 500 as illustrated in FIG. 5 is explained in the following with reference to FIG. 7 which shows a control system that may be seen to be based on an extraction of some of the functions of the control system of the power generation system 400 shown in FIG. 4.

FIG. 7 shows a power generation system 700 comprising a control system in start-up mode according to an embodiment.

Analogously to power generation system 400 shown in FIG. 4, the power generation system 700 includes an electrical generator 701, a generator side power converter 702, a DC link 703, a grid side power converter 704, a line filter 705, a power grid 706, a grid side power converter controller 707, a stator flux observing block 711, a stator flux amplitude and load angle calculating block 712, a first adder 713, a second adder 714, an encoder offset calculating block 715, an speed and position estimation block 716, a first transforming block 717, a second transforming block 718, a stator flux vector generation block 719, a flux vector phase prediction compensation block 720, a multiplication block 721 of sampling time Ts and generator electrical angular speed $\omega_{em}$, a subtracter block 722 to obtain the flux error vector, a multiplication of PWM switching frequency (Fs_PWM) in block 723, and a PWM modulator block 724.

These components may be arranged and configured as explained above for the corresponding components of the power generation system 400 shown in FIG. 4.

In the control system of the power generation system 400, the power producing flux reference comes from the grid power controller. In the generator Bemf voltage synchronization control system of the power generation system 700, the power producing flux reference is set to zero ($\Psi^*_{s\_FP}=0$). In one embodiment, the control system of the power generation system 700 runs at start-up mode when no current flows in the generator, and the generator is disconnected from the power converter with either a contractor or by disabling the PWM gating signals. In addition, the control system of the power generation system 700 includes a rotor flux magnitude computation block 725 which receives the electrical angular frequency $\omega_{em}$ of the rotor and the line-to-line Bemf (back electromagnetic force) voltage Us12 as input and generates the rotor flux value $\Psi_r$.

The encoder offset calibration block 715, the speed and position estimation block 716, the first transforming block 717, the second transforming block 718, and the rotor flux magnitude computation block 725 may be part of an encoder offset and rotor flux amplitude identification block 726.

The stator flux observing block 711, the stator flux amplitude and load angle calculating block 712, the first adder 713, the second adder 714, the stator flux vector generation block 719, the flux vector phase prediction compensation block 720, the sampling time multiplication block 721, the subtracter block 722, the PWM switching frequency (Fs_PWM) multiplication block 723, and the PWM modulator block 724 may be part of a stator flux feedback control validation block 727.

The power generation system 700 further includes, possibly as a part of the stator flux feedback control validation block 727, a validation signal generation block 728 which receives the electrical angular frequency $\omega_{em}$ and the stator voltage vector $u_s^*$ for PWM modular input which may be seen as the control signal generated by the stator flux control or may be seen, as explained with reference to FIG. 5, as a first parameter value representing a control signal for controlling the stator flux of a stator of an electrical generator.

In one embodiment, the power generation system 700 performs a self-diagnostic method for validating the core algorithms of the stator flux control system. The validation is for example carried out in the turbine start-up process when the generator 401 (e.g. a PM generator) rotates in open circuit conditions, i.e. when the PWM modulator block 724 is disabled or the converter terminal is disconnected from the generator terminal with a contactor so that no power is supplied from the generator 701 to the power grid 706. The self-diagnostic method is activated after the encoder position offset has been determined (by the encoder offset calibration block 715), the rotor flux magnitude has been identified from the measured stator Bemf voltage (by the rotor flux magnitude computation block 725) and the generator speed and position have been estimated from measurement by the estimation block 716.

In one embodiment, the activated modules in the self-diagnostic validation are for example an encoder filtering and position and speed estimation module, including e.g. the position and speed estimation block 716 and the encoder offset calculating block 715, the stator flux reference generation module 719, the stator flux observer module 711, a stator flux feedback control module including e.g. the subtracter block 722 of the stator flux error vector, a stator Bemf voltage measurement and signal process module (not shown), and the validation signal generation block 728.

In the validation period, the stator flux magnetization component, which is an input to the stator flux amplitude and load angle calculating block 712, is set equal to the rotor flux magnitude, i.e. $\Psi^*_{s\_mag} = \Psi_r$.

Furthermore, the stator flux power producing component, which is also an input to the stator flux amplitude and load angle calculating block 712, is set to zero, i.e. $\Psi^*_{s\_FP} = 0$.

The rotor flux position is obtained by the second adder 714 by adding the encoder offset value to the position signal from encoder. The stator flux reference vector is generated in the alpha-beta frame by the stator flux vector generation block 719. The stator flux observing block 711, which determines the stator flux vector in the αβ frame.

Stator flux vector feedback control is applied to generate the stator voltage reference signal $u_s^*$ which is fed to the validation signal generation block 728.

The details of the operation of the validation signal generation block 728 according to one embodiment is explained in the following with reference to FIG. 8.

Figure 8:
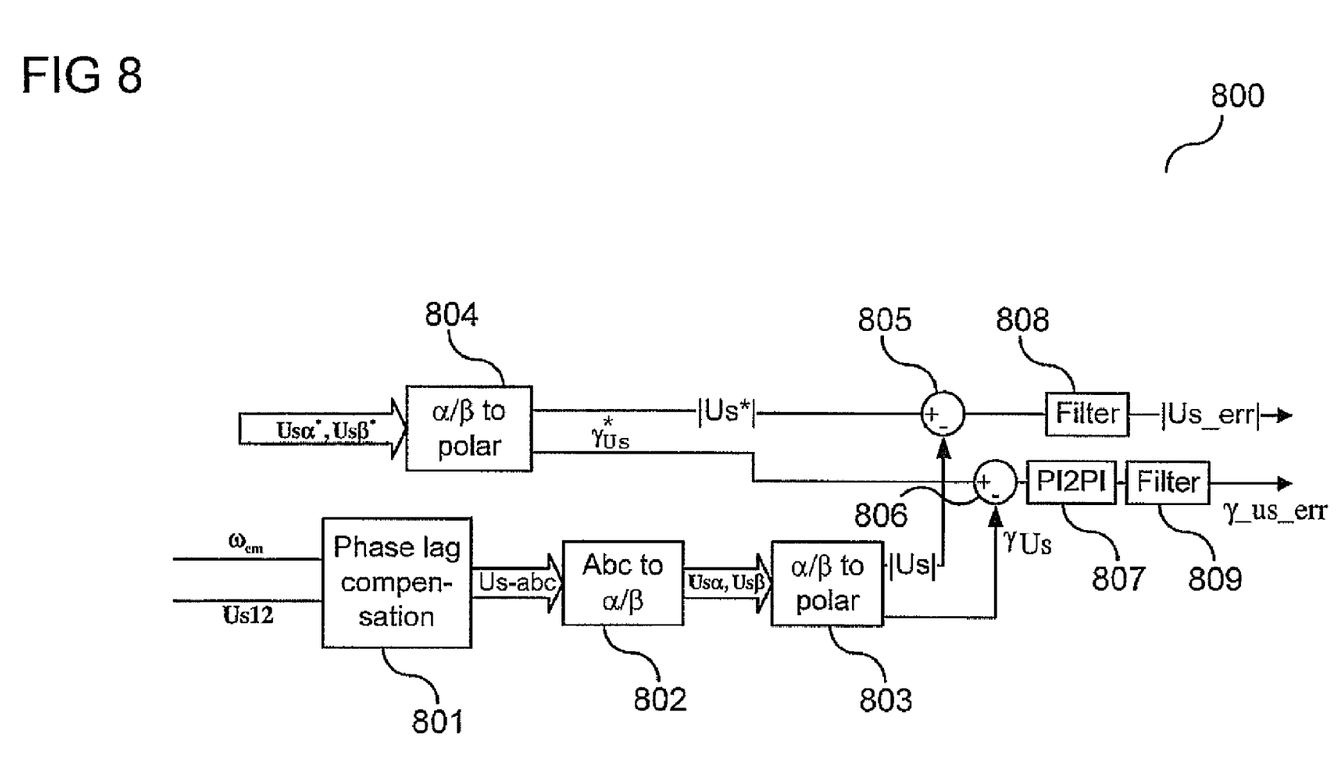
FIG. 8 shows a validation signal generation block activated in the start-up mode according to an embodiment of the present invention.

FIG. 8 shows a validation signal generation block 800 according to an embodiment.

In this example, only one stator line-to-line Bemf voltage Us12 is measured and input to the validation signal generation block 800. The stator line-to-line Bemf voltage Us12 may be seen as an electrical characteristic of the generator 701. A phase lag compensation method is applied by a signal generation block 801 to generate the three symmetrical stator phase Bemf voltages which are processed by first transforming block 802 generating, from the stator phase Bemf voltages, the stator voltage vector in the αβ frame. The stator voltage vector is transformed by a second transforming block 803 to the polar coordinate system such that the phase $\gamma_{US}$ and the magnitude |Us| of the (measured) stator voltage vector are obtained in polar coordinates.

The magnitude of the stator voltage reference vector |Us*| and the phase $\gamma^*_{US}$ of the stator voltage reference signal are obtained by a third transforming block 804, carrying out an αβ frame to polar transformation, from the stator voltage reference vector components Us*$_\alpha$, Us*$_\beta$ in the αβ frame.

A first subtracting block 805 determines the difference between the magnitude of the |Us| of the (measured) stator voltage vector and the magnitude of the stator voltage reference vector |Us*|. The output of the first subtracting block 805 is also referred to as the magnitude error.

A second subtracting block 806 determines the difference between the phase $\gamma_{US}$ of the (measured) stator voltage vector and the phase $\gamma^*_{US}$ of the stator voltage reference signal. The output of the first subtracting block 806 is also referred to as the phase error. The phase error, being an angle, may be mapped to a value in the range between $-\pi$ and $\pi$ by a mapping block 807.

The magnitude error and the phase error are filtered by respective low pass filters 808, 809 and may be used as the validation signal for the stator flux feedback control system, e.g. in the form of an amplitude error of the stator voltage signal |Us_err| and a phase error of the stator voltage signal γ_us_err. The validation signal generated is compared with a predefined threshold value to decide whether the start-up validation process is successful. If the validation signal specifies that the magnitude error and/or the phase error are very large (e.g. are above a pre-defined threshold) and hence, presumably, the stator flux control system has malfunctioned, the control system of the power generation system 700 is kept in open circuit state and a validation error message is sent to the turbine central controller. On the other hand, if the validation signal shows that the stator flux control system functions correctly, the control system of the power generation system 700 in the start-up mode is transformed to control system of the power generation system 400 in the power generation mode to enter closed loop power control state to supply power to the power grid 406.

After start of the stator flux feedback control for the control system of the power generation system 700, a delay time for start of validation may be applied to avoid the effects of the dynamics of the low pass filter and the phase lag compensation. Afterwards, the amplitude error and phase error of the stator voltage signal is, in one embodiment, continuously checked against the threshold settings in a defined validation period.

The validation is for example successful, i.e. the functionality of the stator flux control system has been successfully validated, if both the magnitude error and the phase error of the stator voltage are within pre-defined thresholds. In this case, the control system 700 continues the generator start-up process by closing the machine side contactor followed by enabling the PWM circuit 724, then transferring to control system 400 by activating the power control block 409 and the field weakening control block 410 respectively to generate the power producing flux reference component $\Psi^*_{s\_FP}$ and magnetization flux reference component $\Psi^*_{s\_mag}$. If the validation fails, the generator start-up process is for example stopped and an error message is sent to the turbine central control system to initiate an error handling converter shutdown.

The proposed validation scheme may be executed in a safe manner by disabling the gating signal from PWM modulation block 724 to the machine converter, i.e. the generator side power converter 702. Most of the function modules activated in the validation are also used in the same way in the normal power generation as shown in FIG. 4. The validation avoids converter system failure due to malfunction of some of the most important functions as listed below:

Position signal estimation from encoder measurement
Position offset value estimation from encoder calibration algorithm
Generator rotor flux value determination from identification algorithm
Computation for stator flux reference signal generation
Computation for stator feedback control
Computation for stator flux observation In the case when all above functions are working properly, the stator voltage reference generated by stator feedback control is synchronized with the generator Bemf voltage for the respective operation speed, i.e. should only differ from the generator Bemf voltage within certain tolerance levels. The validation thus also provides a smooth current transition method before enabling the gating signal from PWM modulation block 724 to the power converter for the stator flux control by initializing the stator flux feedback controller properly. A large dynamic current and torque transition is thus avoided for the stator flux control system.

Thus, the validation method according to one embodiment allows build-up of a voltage reference synchronized with the synchronous generator Bemf voltage first under the open circuit condition to ensure a smooth power generation at starting up. Initialization of a synchronous generator controller in the stationary reference frame during no load is very critical for the controller start-up. If such a procedure is not initiated, a current surge is observed. Such currents may be tolerable to the converter of a wind turbine control system, but the mechanical modules like gearbox may not be able to take the resulting huge torque transition.

Additionally, the method according to one embodiment provides a more reliable approach to validate the encoder functionality compared to the conventional method to verify the encoder functionality using signal conditioning on encoder readings. The provided scheme uses the control system functionality to verify the encoder reading. According to one embodiment, any encoder fault will cause the stator voltage reference instantaneously to deviate from the generator Bemf voltage and can be captured in the validation criteria.

Furthermore, according to one embodiment, the method allows the verification of most of the important algorithms for stator flux control before applying the same algorithms for power generation. This prevents damage on the power generation (e.g. wind turbine power generation) system.

Embodiments allow safely validating the important control system settings (rotor flux magnitude, encoder offset value) for the stator flux controller in the generator start-up before allowing power generation. In the failure cases, the internal signals of validation control process are logged for further diagnosing the possible cause of the failure. The possible failure reasons that can be identified in the validation process includes the stator voltage sensor failure, the encoder position or speed measurement failure, the position offset calibration failure, the rotor flux measurement failure, or the stator flux observation failure.

Furthermore, embodiments provide a smooth current and torque connection method for a synchronous generator when PWM is enabled and the stator flux control system is transferred to power generation stage.

The function blocks described above and shown in the figures can be implemented either with hardware circuitry or a software program which is executed in a digital processor.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which are described in detail may also be understood as a "circuit" in accordance with an alternative embodiment.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for validating a control system for an electrical generator connected to a power converter in a wind turbine, the method comprising:
    generating a first parameter value representing a control signal for controlling the stator flux of a stator of the electrical generator;
    measuring a second parameter value specifying an electrical operational characteristic of the electrical generator;
    determining an accuracy level of the control signal based on the first parameter value, the second parameter value, and the third parameter value; and
    obtaining a fourth parameter value specifying a mechanical operational characteristic of the electrical generator,
    wherein the accuracy level of the control signal is determined based on the first parameter value, the second parameter value, and the fourth parameter value, and the accuracy level of the control signal has to fall within a predefined threshold for the control system to be validated.

2. The method according to claim 1, wherein the method is run as part of a generator start-up process.

3. The method according to claim 1, wherein the mechanical operational characteristic includes at least one of the position and the rotational speed of a rotor of the electrical generator.

4. The method according to claim 1, wherein the control signal is provided to the power converter and a resultant converter output voltage is obtained.

5. The method according to claim 1, further comprising:
    determining a third parameter value specifying an accuracy level of the at least one first parameter value based on the first parameter value and the second parameter value.

6. The method according to claim 1, wherein the electrical operational characteristic is a stator line voltage of the generator.

7. The method according to claim 1, wherein the first parameter value comprises a stator voltage reference.

8. A control system for an electrical generator connected to a power converter in a wind turbine, the control system comprising:
    a stator flux controller configured to generate a first parameter value representing a control signal for controlling the stator flux of a stator of the electrical generator;
    a first measuring device configured to measure a second parameter value specifying an electrical operational characteristic of the electrical generator;
    a determining device configured to determine a third parameter value specifying an accuracy level of the at least one first parameter value based on the first parameter value and the second parameter value;
    a second measuring device configured to obtain a fourth parameter value specifying a mechanical operational characteristic of the electrical generator;
    a validation unit configured to determine an accuracy level of the control signal based on the first parameter value and the second parameter value,
    wherein the accuracy level of the control signal has to fall within a predefined threshold for the control system to be validated.

9. The control system according to claim 8, being able to provide a comparison between a power converter output voltage and a back electromotive force voltage of the electrical generator.

10. The control system according to claim 8, wherein the mechanical operational characteristic comprises at least one of the position or the rotational speed of a rotor of the electrical generator.

11. The control system according to claim 8, wherein the electrical generator is part of a power generation system which may be set, from a starting mode to an operation mode in which it supplies power generated by the electrical generator to a power grid, and the control system is configured such that the control signal is generated and the first parameter value and the second parameter value are measured in the starting mode.

12. The control system according to claim 11, wherein, in the starting mode, the electrical generator is not connected to the power converter.

13. The control system according to claim 8, wherein the electrical operational characteristic is a stator line voltage of the generator.

14. The control system according to claim 8, wherein the first parameter value comprises a stator voltage reference.

15. A computer readable medium having a computer program recorded thereon, the computer program comprising instructions which, when executed by a processor, make the processor perform a method for validating a control system for an electrical generator connected to a power converter in a wind turbine, the method comprising:

generating a first parameter value representing control signal for controlling the stator flux of a stator of the electrical generator;

measuring a second parameter value specifying an electrical operational characteristic of the electrical generator;

obtaining a fourth parameter value specifying a mechanical operational characteristic of the electrical generator; and determining an accuracy level of the control signal based on the first parameter value, the second parameter value, and the third parameter value, wherein the accuracy level of the control signal is determined based on the first parameter value, the second parameter value, and the fourth parameter value, and the accuracy level of the control signal has to fall within a predefined threshold for the control system to be validated.

16. The computer readable medium according to claim 15, wherein the method further comprises:

after the control system is validated, transiting smoothly from a start-up control mode to a power generation control mode by first closing a generator side contactor followed by enabling a pulse width modulation gating signal to the power converter, and further followed by enabling power feedback control for power producing flux reference component generation and enabling the field weakening control for magnetization flux reference component generation.

* * * * *